[72] Inventors Yuko Nakamura; Hisakichi Yamane, Tokyo; Akio Yanagimachi, Kawasaki, Japan
[21] Appl. No. 626,017
[22] Filed Mar. 27, 1967
[45] Patented Dec. 29, 1970
[73] Assignee Japan Broadcasting Corporation Tokyo, Japan
[32] Priority Mar. 31, 1966
[33] Japan
[31] No. 41/19748

[54] SUPERVISORY AND CONTROL SYSTEM OF TELEVISION IMAGE SIGNAL FOR THE BROADCASTING PROGRAM
6 Claims, 9 Drawing Figs.

[52] U.S. Cl. 178/5.6
[51] Int. Cl. H04n 5/00
[50] Field of Search 178/5.6, 5.8, 5.1

[56] References Cited

UNITED STATES PATENTS 3,073,892 1/1963 Druz 178/5.1

*Primary Examiner*—Richard Murray
*Attorney*—Stevens, Davis, Miller & Mosher

ABSTRACT: This invention relates to a supervisory and control system for television image signals for the operation of program control or a fault supervision over an extensive television broadcasting signal transmitting network. The system comprises means in the transmitting equipment to insert pulses consisting of two different frequencies selected from a group of frequencies to form an information signal and means in the receiving equipment to detect the transmitted information signal by using a frequency discriminating circuit and an amplitude emphasizing circuit. The system of the invention can afford a great advantage of preventing false operation of the information signal by signal imitation while using a very simple detecting circuit, thus obtaining a reliable transmission of the required information signal.

SUPERVISORY AND CONTROL SYSTEM OF TELEVISION IMAGE SIGNAL FOR THE BROADCASTING PROGRAM

BACKGROUND OF THE INVENTION

The present invention relates to supervisory and control system of television image signals for program discrimination or fault supervision, and for carrying various controls such as an instruction of program transmission and the operation by transmitting a special information signal superposed on an image signal, mainly on that of a television broadcasting signal.

An object of the present invention is to provide a device applicable to a novel and useful system for controlling and supervising a nationwide television broadcasting network consisting of many kinds of district center stations and the lower grade stations and relay stations at a central broadcast controlling station, in order to effect a smooth operation and control of transmitting and repeating of a complicated nationwide television broadcasting program and many local television broadcasting programs, which system may obviate routine acts by the operational staffs.

Another object of the present invention is to provide a very effective and convenient device for the supervision and control of a nationwide television broadcasting network while transmitting a television image signal as usual, and further transmitting a selected control signal from a plurality of necessary kinds of broadcasting program operational instructions or a supervisory signal for necessary program reception confirmation or faults supervision, such as an instantaneous open circuit of the transmission path, by using available transmission time space.

A further object of the present invention is to provide a very simple and stable operable device which makes possible secure and rapid detection of supervisory and control signals inserted in the spare time of a television image signal transmission, with high reliability, when the television signal is transmitted and the control is carried out by the supervisory and control signals for the necessary instruction of program discrimination, fault supervision and program operation, so that it can maintain a permanent reliability without using a complicated gate circuit for extracting the signals, and without causing any erroneous operation by the components of a similar frequency involved in the image signal or random noises induced in the transmission circuit.

SUMMARY OF THE INVENTION

In order to accomplish the above objects, a basic embodiment will serve to illustrate the device according to the present invention as follows:

In accordance with the system of the invention a part of a vertical blanking period of an image signal in a television broadcasting, e.g. in the 1st field, the 19th horizontal scanning period and in the second field the 282nd horizontal scanning period is utilized and pair known high frequency signals are inserted as a pair of pulse signals adjacent to each other. Further, the order of each inserting position of said two frequency signals is alternatively reversed at every predetermined period, for instance each field period so as to form an information signal and the information signal is transmitted together with the television signal in superposition. In a receiving device, the supervisory information can be obtained by detecting and discriminating the combination and the reversing period of the two frequency signals by using a receiving demodulation circuit which is suitable for the detection.

In a control signal for a program switching operation, a signal is formed by entirely the same manner, but as the inserting period the 21st horizontal scanning period of a vertical blanking period is used for the 1st field and the 284th horizontal scanning period is used for the 2nd field, and the control signal is detected at the receiving device.

An embodiment for forming and detecting the information signal will further be explained in conjunction with the accompanying drawings hereinafter.

DESCRIPTION OF THE PREFERRED EMBODIMENTS

Figure 1:
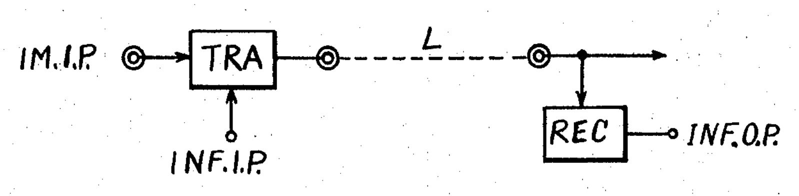
FIG. 1 is a block diagram explaining the basic principle of the system of the invention.

The system of the invention comprises transmitting equipment TRA inserted in the television signal transmission line L and receiving equipment REC which is branched from the transmission line as shown in FIG. 1.

Figure 2:
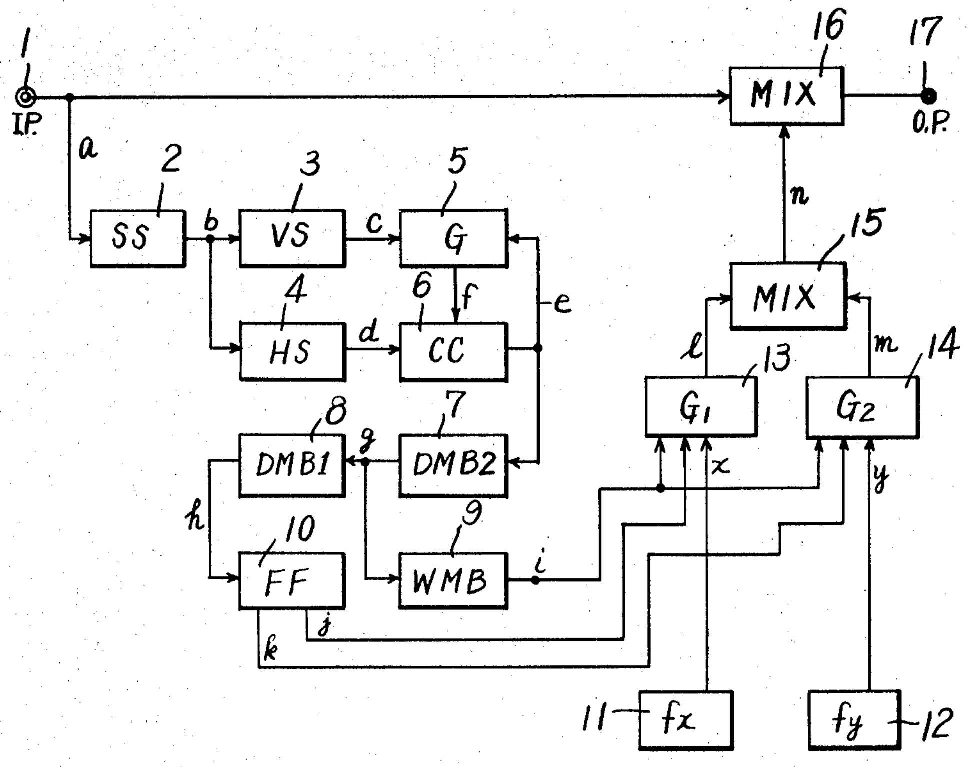
FIG. 2 is a block diagram of transmitting equipment according to an embodiment of the invention.
Figure 3:
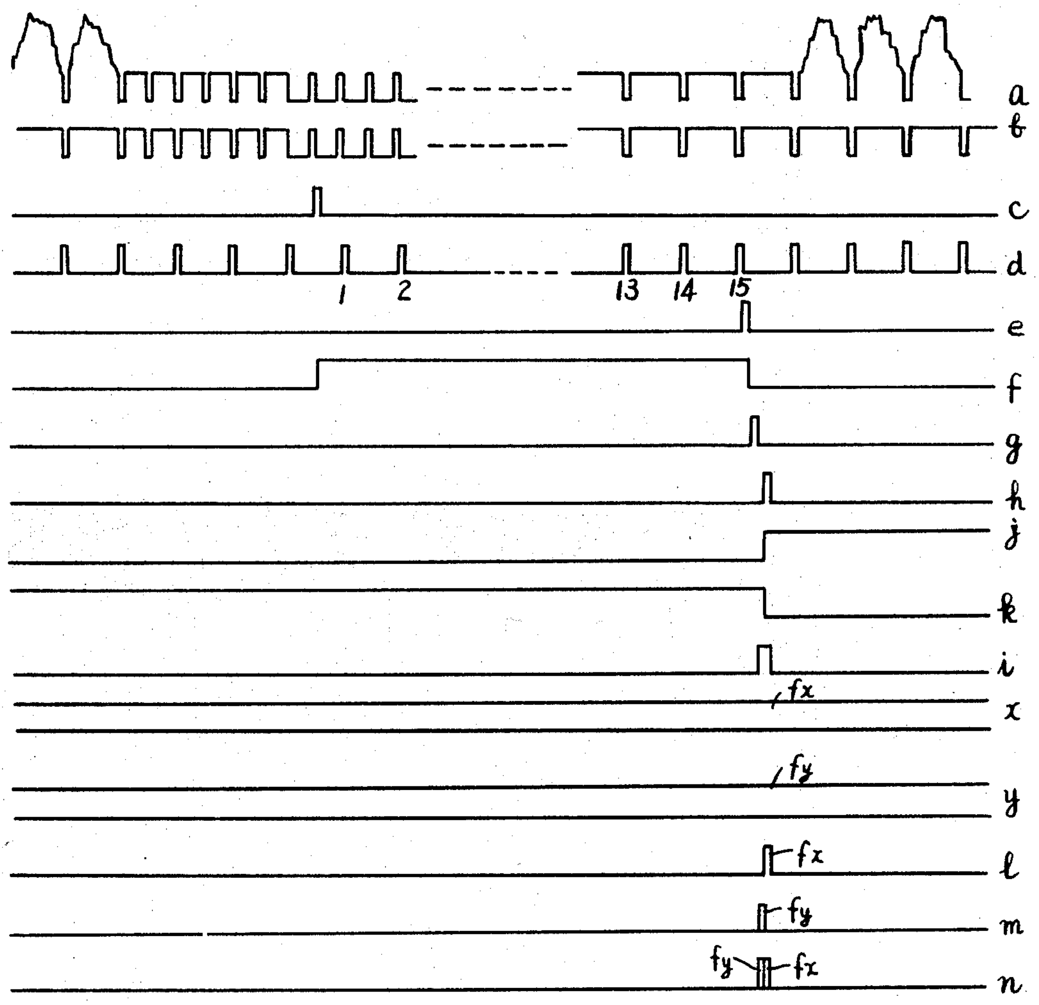
FIG. 3 is a wave form diagram explaining the operation of the device shown in FIG. 2.

At first, formation of said supervisory information signal will be explained by way of an example of transmitting equipment TRA, the detail of which is shown in FIG. 2 and the wave forms for each part thereof are shown in FIG. 3.

In FIG. 2, 1 is an input terminal for an image signal. The television image signal applied to the terminal 1 has a wave form as shown in line *a* of FIG. 3. This signal is then fed to synchronizing signal separating circuit 2 and a mixing circuit 16. In the synchronizing signal separating circuit 2 synchronizing signal *b* is separated from the image signal *a*. From the synchronizing signal *b* a vertical synchronizing signal c and horizontal synchronizing signal *d* are extracted respectively by means of a vertical synchronizing signal detecting circuit 3 and a horizontal synchronizing signal detecting circuit 4. The horizontal synchronizing signal *d* is applied to counting circuit 6. The operation of the counting circuit 6 is restricted by the signal *f* supplied from a gate circuit 5 before the arrival of the vertical synchronizing signal *c* to the gate circuit 5. When the vertical synchronizing signal *b* is detected by the detecting circuit 3 and then applied to the gate circuit 5, the gate circuit 5 releases the prohibition of signal f and the counting circuit 6 starts continuous count of the number of horizontal synchronizing signals *d*. The counting circuit 6 produces trigger pulse *e* after counting 15 horizontal synchronizing signals. The trigger pulse *e* is on the one hand applied to the gate circuit 5 and closes this circuit and on the other hand applied to a delay multivibrator 7. The trigger pulse *e* is delayed about 20 $\mu$ S period by the delay multivibrator 7 and the output trigger pulse g therefrom is applied to further delay multivibrator 8 and width multivibrator 9. This pulse is delayed 20 $\mu$ S in the delay multivibrator 8 and the output trigger pulse *h* is applied to a flip-flop circuit 10 and controls the operation of this circuit. The width multivibrator 9 produces width pulse signal *i* having 40 $\mu$ S width. A gate circuit *i* picks up an output signal *x* of an oscillating circuit 11 and applies it to a mixing circuit 15 during a period of coincidence of 40 $\mu$ S width pulse signal *i* and the output signal *j* of flip-flop circuit 10. A gate circuit 14 picks up an output signal *y* of an oscillating circuit 12 and applies it to the mixing circuit 15 during the period of coincidence of the width pulse signal *i* and the output signal *k* of the flip-flop circuit 10. The mixing circuit 15 mixes the output signal *b* of the gate circuit 13 and the output signal *m* of the gate circuit 14 and produces an information carrier signal *n* and applies it to the mixing circuit 16. In the mixing circuit 16, the image signal *a* and the information signal carrier signal *n* are mixed and supplied to the television signal transmitting terminal 17 and the signal is transmitted out to the line. The transmitting signal has for example a wave form shown in line *o* of FIG. 5.

Figure 6:
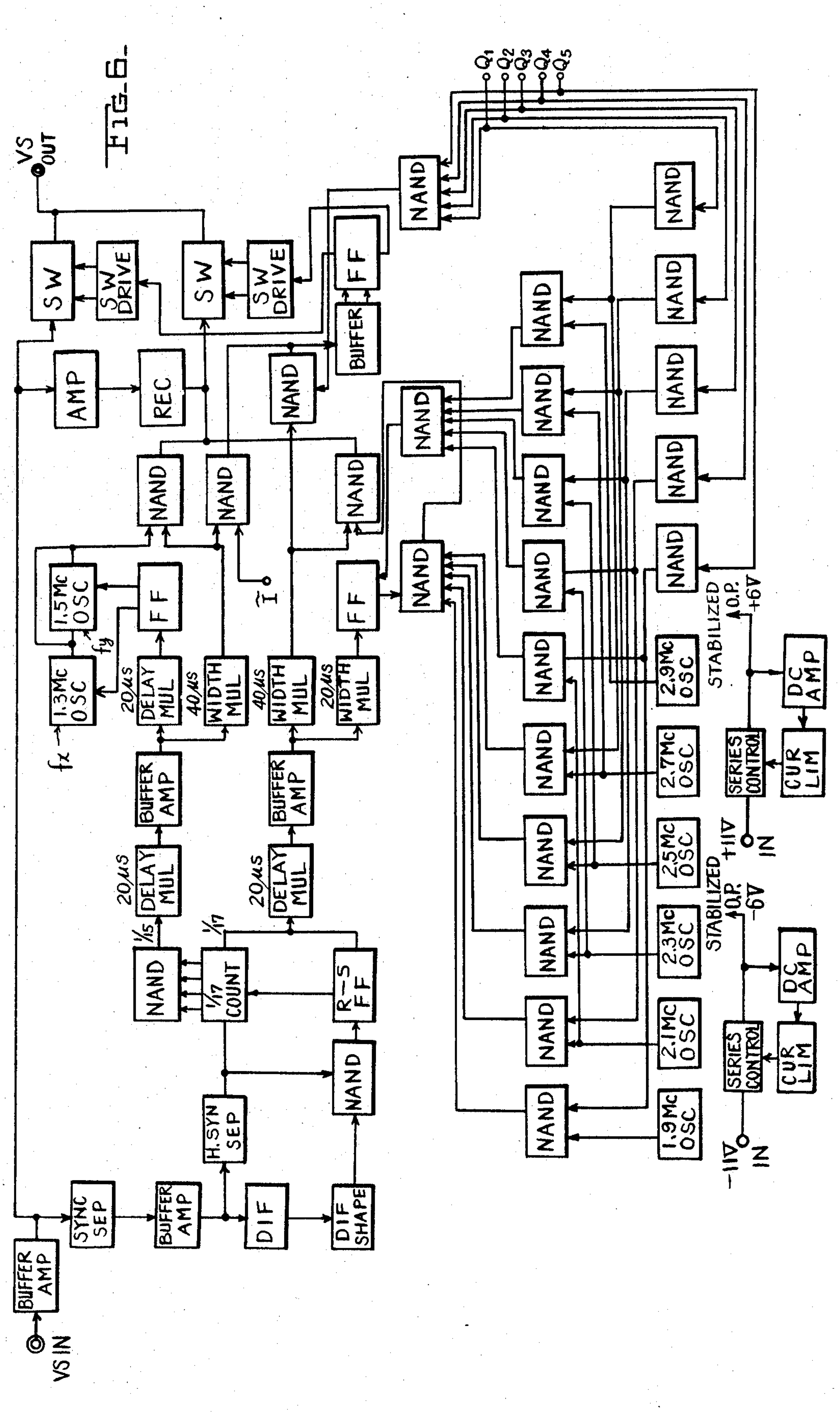
FIG. 6 is a simplified circuit diagram of a practical information signal forming device according to the invention applicable in the transmitting equipment of a practical television broadcasting system.

FIG. 6 shows a detailed circuit of a practical embodiment for forming an information signal according to the present invention as briefly explained above.

This circuit is used for actual supervision and control of the transmission of signals for broadcast television programs.

In this practical circuit, a desired control information signal according to the kind of instructions $Q_1$—$Q_5$ is formed by selecting two signal frequencies out of six oscillating circuits, having oscillating frequencies of 1.9Mc, 2.1Mc, 2.3Mc, 2.5Mc, 2.7Mc and 2.9Mc. Then the information signal is sent to the gate circuit to form the desired control signal.

Figures 7, 9:
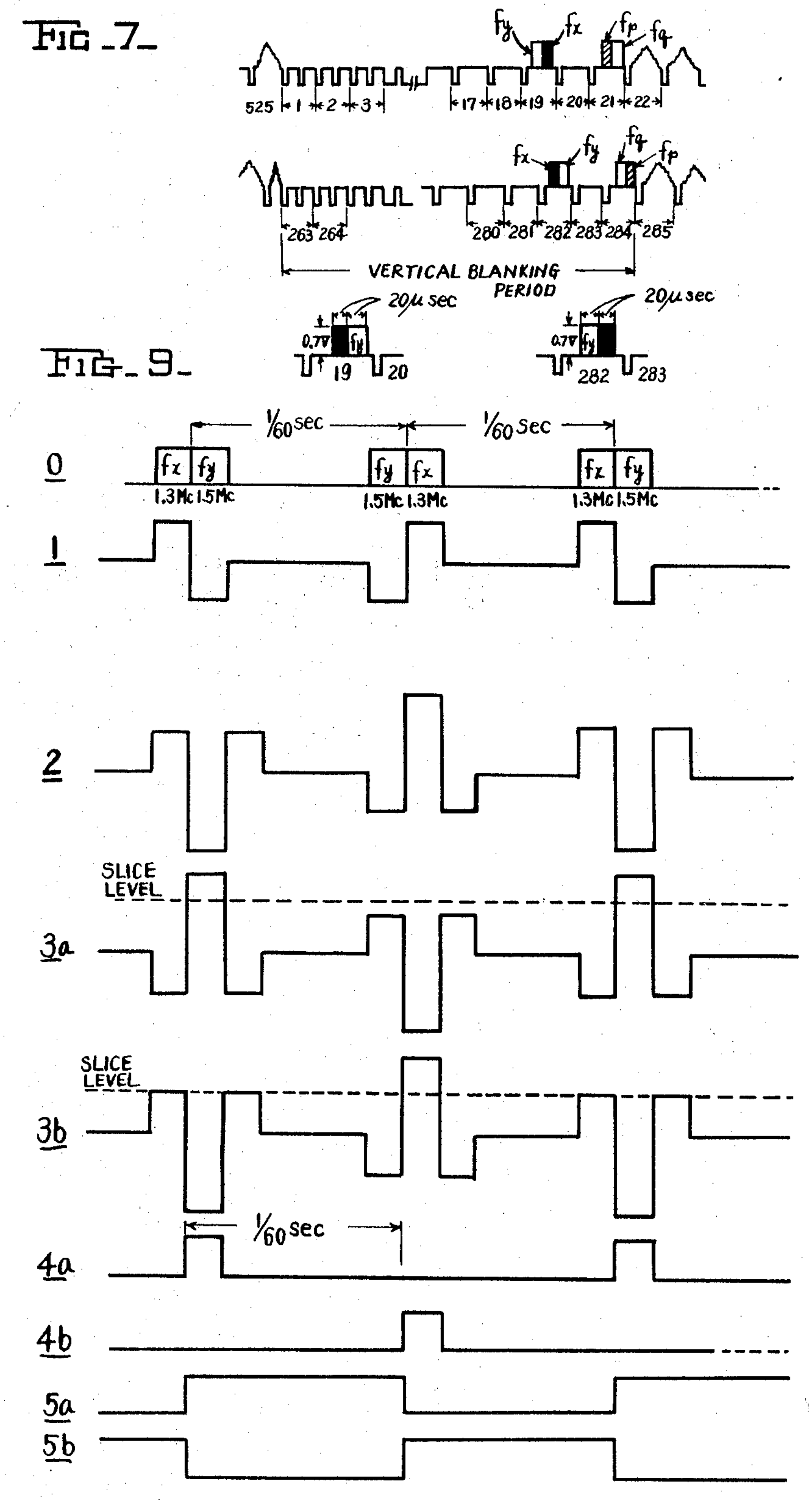
FIG. 7 is a wave form diagram of the signal transmitted from the transmitting equipment shown in FIG. 6.
FIG. 9 is a diagram explaining the operation of receiving circuit according to the invention.

FIG. 7 shows a superposed wave form of a television signal and the transmitted supervisory and control signals. The composite signal having this wave form is transmitted from the transmitting equipment of a central station.

This FIG. shows a superposed wave form of a supervisory information signal consisting of a combination of two frequencies *fy* and *fx* and a controlling information signal consisting of a combination of another two frequencies *fq* and *fp* each of which is superposed on a television signal. As shown in the FIG. the sequence of the component frequencies of each combination is reversed at each successive blanking period.

Figure 4:
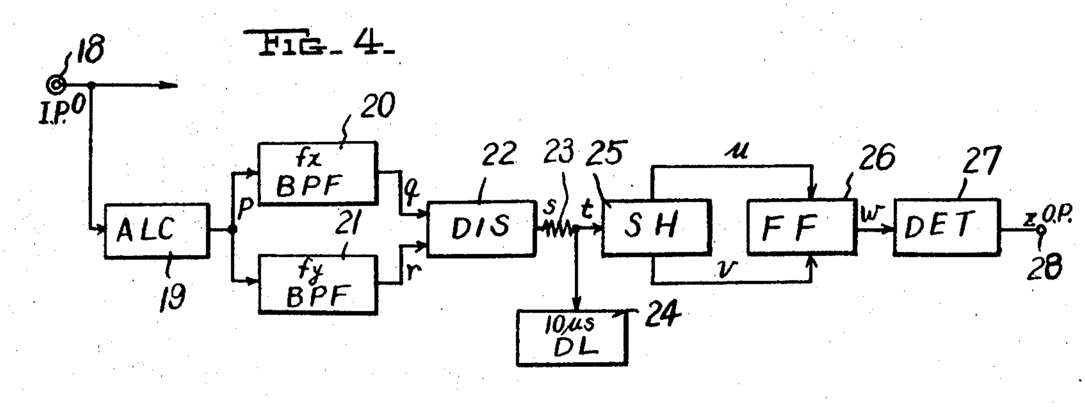
FIG. 4 is a block diagram of receiving equipment according to an embodiment of the invention.
Figure 5:
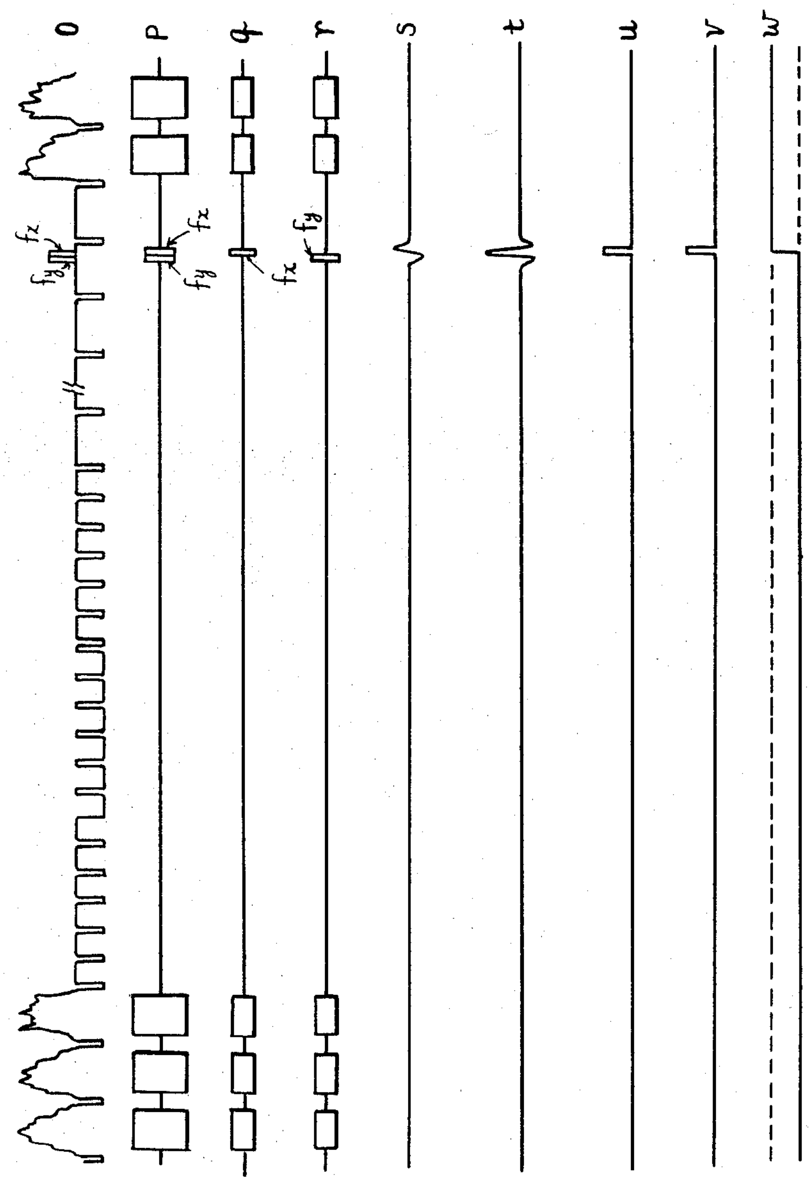
FIG. 5 is a wave form diagram explaining operation of FIG. 4.

Now, a receiving circuit REC according to the invention will be explained, with reference to FIGS. 4 and 5. The television image signal *o* is branched from input terminal 18 of image signal receiving circuit and is applied to an amplitude limiting circuit 19 and the output signal *p* is obtained. The signal *p* is applied to band pass filters 20 and 21 having center frequencies *fx* and *fy* respectively. Each frequency component of *fx* and *fy* is filtered out to produce the output signals *q* and *r*. These two signals are applied to discriminating circuit 22 and a detected signal *s* is derived therefrom. The signal *s* is applied via a matching resister 23 to a 10 μ S delay line 24 of which the receiving terminal is short circuited. The signals are reflected at the terminated end of the delay line 24 and the reflected signal having reversed phase and also delayed altogether 20 μ S is superposed to the signal *s* and resultant signal *t* is applied to a shaping circuit 25. The shaping circuit 25 amplifies the signal *t* and produces the pulse signal *u* having an amplitude exceeding a predetermined threshold value. At the same time the circuit 25 reversely amplifies the signal *t* and produces the pulse signal *v* having an amplitude exceeding the predetermined threshold value. These two signals *u* and *v* are applied to a flip-flop circuit 26. The flip-flop circuit 26 functions in alternative operation by the pulse signals *u* and *v*. The signal *w* having the alternative period is rectified and detected by a detecting circuit 27, then an information signal *z* is obtained at the information signal output terminal 28. The signal *z* is a DC on-off signal (not shown).

Figure 8:
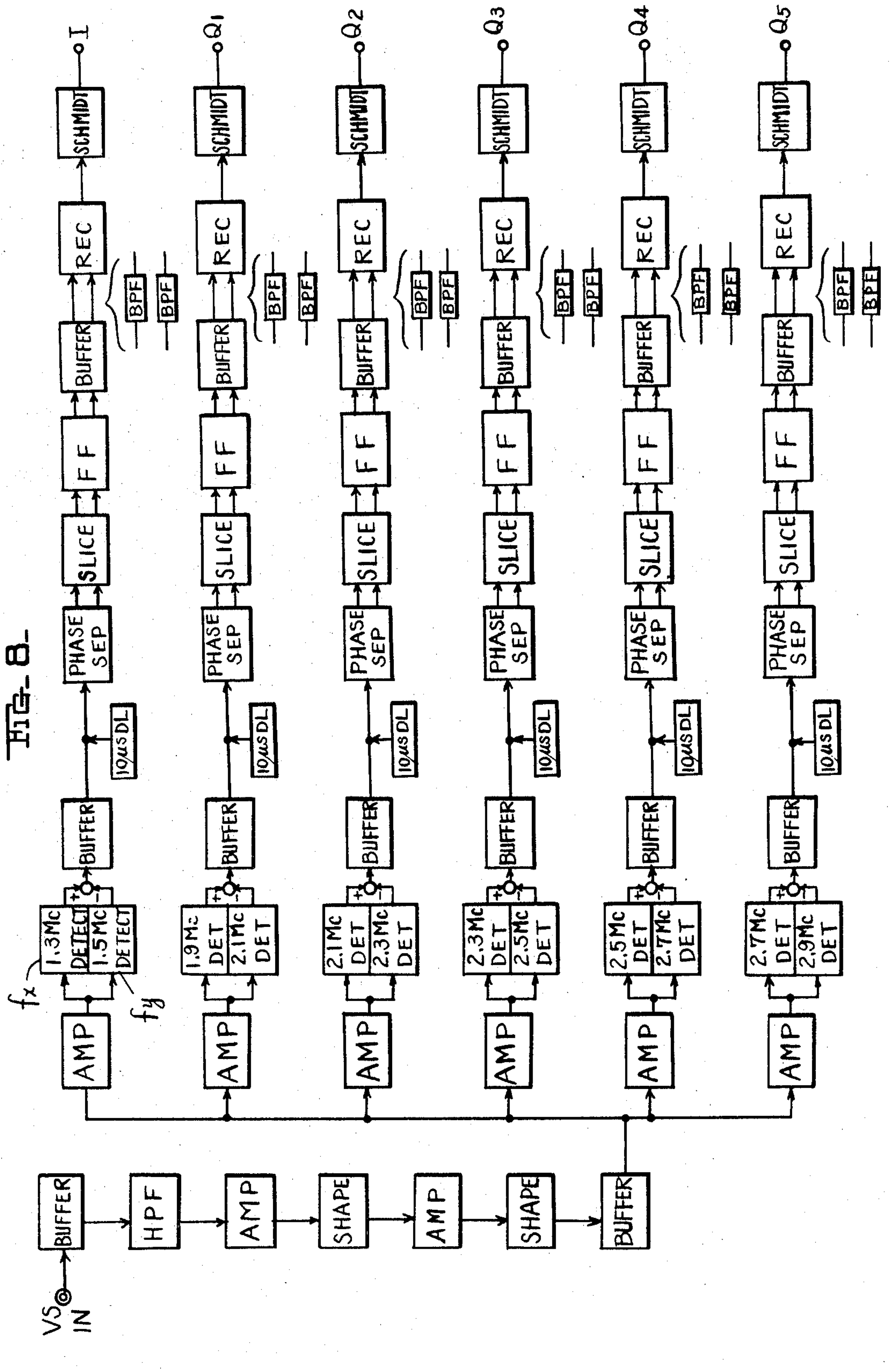
FIG. 8 is a receiving equipment used in conjunction with the equipment shown in FIG. 6.

A practical circuit diagram of the receiving equipment is shown in FIG. 8 which is used in conjunction with the supervisory and control signal forming equipment of the transmitting circuit shown in FIG. 6. The signal detecting operation of the embodiment shown in FIG. 8 will be explained by referring also FIG. 9.

In FIG. 9, curve O shows, for example, the supervisory information signal consisting of the two frequencies *fx* (1.3Mc) and *fy* (1.5Mc), which is detected in the detecting portion of the band pass filters. Then after frequency discrimination a wave form 1 of the FIG. 9 is obtained, and further by means of a signal emphasizing circuit utilizing the time difference, pulse wave form 2 which corresponds to the two frequency signal and having an emphasized amplitude is obtained. The pulse signal 2 is divided into two portions and the one portion is reversed in phase to form wave form 3*a*. Two wave forms 3*a* and 3*b* are sliced respectively as shown by the dotted lines. The obtained pulse series consists of two pulse series, each of which has one frame period and is shifted apart for one field period as shown in 4*a* and 4*b*. Each of the pulse series is applied to the flip-flop circuit. Square wave forms having a 30 cycle frequency, as shown in 5*a* and 5*b*, are obtained. According to the invention, this alternative current is filtered out by a band pass filter and after rectification the desired information signal can be detected from the output signal thereof. For example, even if a signal having said two frequencies *fx* and *fy*, without altering the sequence of the position at each field, were detected, only one side of above mentioned pulse series would be applied at the input terminal of flip-flop, therefore the flip-flop would not function in alternative operation and no rectified output signal would be derived. By this means the desired information signals can be discriminated completely from the said signals.

According to the system of the invention, a perfect spare time from the view point of image information of television signal transmission is utilized for the transmission of the information signal, therefore, there is entirely no effect for the transmission of a television signal information and accordingly availability of the transmission path can be greatly increased.

Moreover, according to the present invention, a complicated time gate circuit for extracting an information signal from the transmitted television signal is not required in the receiving equipment. Accordingly, a great simplification of the circuit construction is possible and still afford a great advantage of high reliability owing to decrease of the possible faults.

Further, according to the system of the invention, the receiving equipment can afford a great advantage of preventing the disturbance caused by a television image signal and of false transmission of the information signal owing to the fact that even if a frequency component having the same frequencies as the two frequency components of the information signal is included in the image signal component, the frequency discriminating circuit and signal emphasizing circuit using time difference can mitigate such interferences. Moreover a detecting circuit of the polarity reversing in a certain period, for instance in each field period, can perfectly prevent the influence of the false component.

The improved signal to noise characteristics in the frequency discriminating circuit and the signal emphasizing circuit utilizing time difference can perfectly avoid the influence of the disturbance caused by random noises and thus increases the reliability of the required information transmission.

The system of the present invention is very useful for the supervision and control of the nationwide broadcasting networks connecting many stations in each area from the central station for the television broadcasting. However the system of the invention can be further utilized to transmit a broadcasting wave while superposing said information signal on the television image signal. In the receiving end an adapter according to the invention is added to the receiving equipment, thus to obtain various useful operations for the broadcasting program or the control, such as for example for the service of automatic operation of each television receiver for a very serious emergency broadcasting program or for a monitoring check of the receiving program in each receiver for obtaining data for the investigation of the percentage of observers of a program.

Nippon Hoso Kyokai (The Japan Broadcasting Corporation) has made a practical test using above described transmitting and receiving equipment over the main television repeating link (Tokyo-Osaka-Hiroshima-Okayama) and obtained the result shown below and the test is still continuing for the nationwide transmission link. As the result a perfect satisfactory results according to the line of original expectation has been obtained. Further, there is a future plan for introducing the system of the invention for the nationwide transmission network for the supervision and control of the actual operation of the broadcasting program.

RESULTS OF ACTUAL EXPERIMENT

| | |
|---|---|
| (1) Operational test | A control signal from Tokyo was received at Osaka, Hiroshima and Okayama without any trouble. |
| (2) Marginal test | A signal output level of 10 db. lower than the standard level was confirmed to function the system perfectly. |

| | |
|---|---|
| (3) Noise test | Even if a jammed noise level was at almost same level with a control signal, the system was operated completely. |
| (4) Continuously transmitting and receiving test of Cue signal. | Transmitting test of cue signal at every 2 seconds, there was no erroneous operation with the continuous receiving test. |
| (5) Simulation test | It was confirmed that an accurate operation can be carried out in a sequence switching test of nationwide transmission program from Tokyo and local program at Okayama station. |

We claim:

1. A supervisory and control system for television signals for broadcast television programs comprising in combination:

a. transmitting equipment at a broadcasting station, which forms an information signal transmitted with the television signal by superposition for the supervisory and control of the transmitted television signal; and b. at least one receiving equipment at a distant position to be supervised and controlled; wherein said transmitting equipment comprises, means to receive a television signal, means to separate a synchronizing signal from the television signal, means to form at least one information signal which consists of two signals of different frequencies adjacently inserted in a predetermined horizontal scanning period including a vertical blanking period of the television signal and the order of succession of said two signals is alternatively reversed at each successive period of a vertical synchronizing signal, means for producing at least two different frequencies in order to produce said two signals of different frequencies, and means for transmitting the thus obtained information signal with the television signal by superposing it in a predetermined horizontal scanning period included in the vertical blanking period of the television signal via a transmission line; and the receiving equipment comprises, means to convert a received television signal including said superposed information signal in the predetermined horizontal scanning period of the vertical blanking period, received via the transmission line, into a signal having an amplitude wave form corresponding to two signals obtained via two band pass filters the pass band of which correspond to the two frequencies, an amplitude emphasizing means to derive an emphasized amplitude in relation to time length of the amplitude wave form signal and means to produce an output signal responding to the detection of a positive existence of each kind of amplitude signals existing successively in a predetermined period, wherein by a provision of a plurality of frequency producing means, the information signals are formed to correspond to each desired supervision and control item by combining the two frequencies out of a plurality of frequencies, thus to supervise or control the television signal for the broadcast television program transmitted to a location to be supervised and controlled.

2. A supervisory and control system for broadcast television signals having transmitting equipment comprising means for receiving a television signal and applying it to a superposing circuit and to a synchronizing signal separating circuit, a means to extract a predetermined horizontal synchronizing signal positioned at a predetermined position in a vertical blanking period of said television signal by means of counting horizontal synchronizing signal derived from the synchronizing signal separating circuit with reference to a vertical synchronizing signal also obtained from the synchronizing signal separating circuit, means for forming a gate pulse having a predetermined width corresponding to a horizontal scanning period which is in a position succeeding to said particular position of the predetermined horizontal synchronizing signal in the television signal, means for forming a trigger pulse which is delayed one half period of the predetermined width of the gate pulse with reference to the pulse, a flip-flop circuit driven by the trigger pulse to produce outputs having different polarities, at least two single frequency producing sources producing output signals of different frequencies, two gate circuits each of which functions to gate out the signal applied from one of said single frequency producing sources only during the period of coincidence of the gate pulse and the output pulse from the flip-flop circuit, means to obtain a resultant signal by combining the different frequency signals derived from each of the gate circuits, and means to apply the resultant signal thus obtained to said superposing circuit and superpose it with said television signal and to transmit the superposed signal.

3. A transmitting equipment as claimed in claim 2, wherein the period of the information signal is less than about 40 $\mu$ S, and each of the component frequencies of the different frequency signals forming the information signal is controlled less than about 20 $\mu$ S.

4. A supervisory and control system for broadcast television signals having receiving unit which comprises two band pass filters having different pass band frequencies, a frequency discriminator converting the demodulated information signal obtained by combining the output signals of the filters into an amplitude wave form corresponding to the frequency component thereof, an amplitude emphasizing means to emphasize said amplitude wave form signal derived from the output of frequency discriminator by utilizing a predetermined relation of the time duration of the signal, and means to produce a signal according to the existence of the emphasized signal by the emphasizing means.

5. A receiving unit as claimed in claim 4, further comprising means to produce an output signal to which the amplitude wave form signal derived from the frequency discriminator is applied, and the output signal is produced only when the polarity of the amplitude wave form signal is reversed periodically at each predetermined period.

6. A receiving equipment which comprises at least one set of receiving unit having substantially same construction as claimed in claim 5, one set of common circuits, means to apply a television signal having superposed thereon at least one information signal consisting of two different frequencies to each of the receiving devices via said common circuits.